United States Patent
Arimilli et al.

[11] Patent Number: 5,978,871
[45] Date of Patent: Nov. 2, 1999

[54] METHOD OF LAYERING CACHE AND ARCHITECTURAL SPECIFIC FUNCTIONS FOR OPERATION SPLITTING

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/834,114

[22] Filed: Apr. 14, 1997

[51] Int. Cl.[6] ............... G06F 13/00; G06F 12/08; G06F 17/10
[52] U.S. Cl. ................. 710/100; 712/1; 711/118; 364/140.03
[58] Field of Search ................ 395/280, 681, 395/800.01, 800.03; 364/136, 736, 758, 131, 140.03, 736.01; 710/100; 709/301, 300; 712/1, 3, 9, 222; 711/3, 118

[56] References Cited

U.S. PATENT DOCUMENTS

| | | | |
|---|---|---|---|
| 4,128,890 | 12/1978 | Irwin et al. | 364/724.17 |
| 4,215,399 | 7/1980 | Pavicic et al. | 364/136 |
| 4,785,393 | 11/1988 | Chu et al. | 395/562 |
| 5,361,373 | 11/1994 | Gilson | 395/800.01 |
| 5,734,387 | 3/1998 | Patrick et al. | 345/441 |
| 5,745,762 | 4/1998 | Celi, Jr. et al. | 395/681 |

*Primary Examiner*—Gopal C. Ray
*Attorney, Agent, or Firm*—Richard A. Henkler; Daniel E. Venglarik; Andrew J. Dillon

[57] ABSTRACT

Cache and architectural specific functions within a cache controller are layered to permit complex operations to be split into equivalent simple operations. Architectural variants of basic operations may thus be devolved into distinct cache and architectural operations and handled separately. The logic supporting the complex operations may thus be simplified and run faster.

19 Claims, 4 Drawing Sheets

METHOD OF LAYERING CACHE AND ARCHITECTURAL SPECIFIC FUNCTIONS FOR OPERATION SPLITTING

RELATED APPLICATIONS

The present invention is related to the subject matter of the following commonly assigned copending United States patent applications, each filed Apr. 14, 1997: Ser. No. 08/839,442 entitled "Method of Layering Cache and Architectural Specific Functions"; Ser. No. 08/834,115 entitled "Layering Cache and Architectural Specific Functions to Expedite Multiple Designs"; Ser. No. 08/839,445 entitled "Method of Layering Cache and Architectural Specific Functions to Permit Generic Interface Definition"; Ser. No. 08/839,443 entitled "Method of Layering Cache and Architectural Specific Functions to Permit Facilitate Design Extension"; and Ser. No. 08/839,441 entitled "Method of Layering Cache and Architectural Specific Functions to Promote Operation Symmetry." The content of the above-mentioned copending applications is incorporated herein by reference.

BACKGROUND OF THE INVENTION

1. Technical Field

The present invention relates in general to cache controllers in data processing systems and in particular to cache controllers which layer cache and architectural specific functions. Still more particularly, the present invention relates to layering cache and architectural specific functions within a cache controller to permit complex operations to be split into cache and architectural operations.

2. Description of the Related Art

Data processing systems which utilize a level two (L2) cache typically include a cache controller for managing transactions affecting the cache. Such cache controllers are conventionally implemented on a functional level, as depicted in FIG. 4. For example, a cache controller 402 may include logic 404 for maintaining the cache directory, logic 406 for implementing a least recently used (LRU) replacement policy, logic for managing reload buffers 408, and logic for managing store-back buffers 410. In traditional implementations, the cache is generally very visible to these and other architectural functions typically required for cache controllers, with the result that cache controller designs are specific to a particular processors such as the PowerPC™, Alpha™, or the x86 family of processors.

Operations supported by the basic cache controller design depicted in FIG. 4 may be simple or complex. Simple operations convey a single piece of information, while complex operations contain more than one distinct piece of information. Compare, for example, the READ and READ atomic operations supported by the PowerPC™ architecture. The READ operation simply conveys that a given memory location should be read. The READ atomic operation conveys that a specific memory locations should be read, and that the processor initiating the operation should be informed if any other device in the hierarchy changes the data in the memory location. The READ atomic operation is used for synchronization.

To the extent complex operations supported by a given architecture cannot be split, controller logic for supporting that operation must remain interdependent, Often the logic for a complex operations is an intricate state machine supporting a variety of special cases for the operation. Such logic is complex, requires significant silicon area to implement, and is difficult to interlock with other logic supporting other operations.

It would be desirable, therefore, to be able to split complex operations for simplification of the logic supporting the operation. It would further be desirable to split complex operations to increase the speed of their performance by implementing faster logic for performing the operations.

SUMMARY OF THE INVENTION

It is therefore one object of the present invention to provide an improved cache controller for a data processing system.

It is another object of the present invention to provide an improved cache controller having layered cache and architectural specific functions.

It is yet another object of the present invention to layer cache and architectural specific functions within a cache controller to permit complex operations to be split into cache and architectural operations.

The foregoing objects are achieved as is now described. Cache and architectural specific functions within a cache controller are layered to permit complex operations to be split into equivalent simple operations. Architectural variants of basic operations may thus be devolved into distinct cache and architectural operations and handled separately. The logic supporting the complex operations may thus be simplified and run faster.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
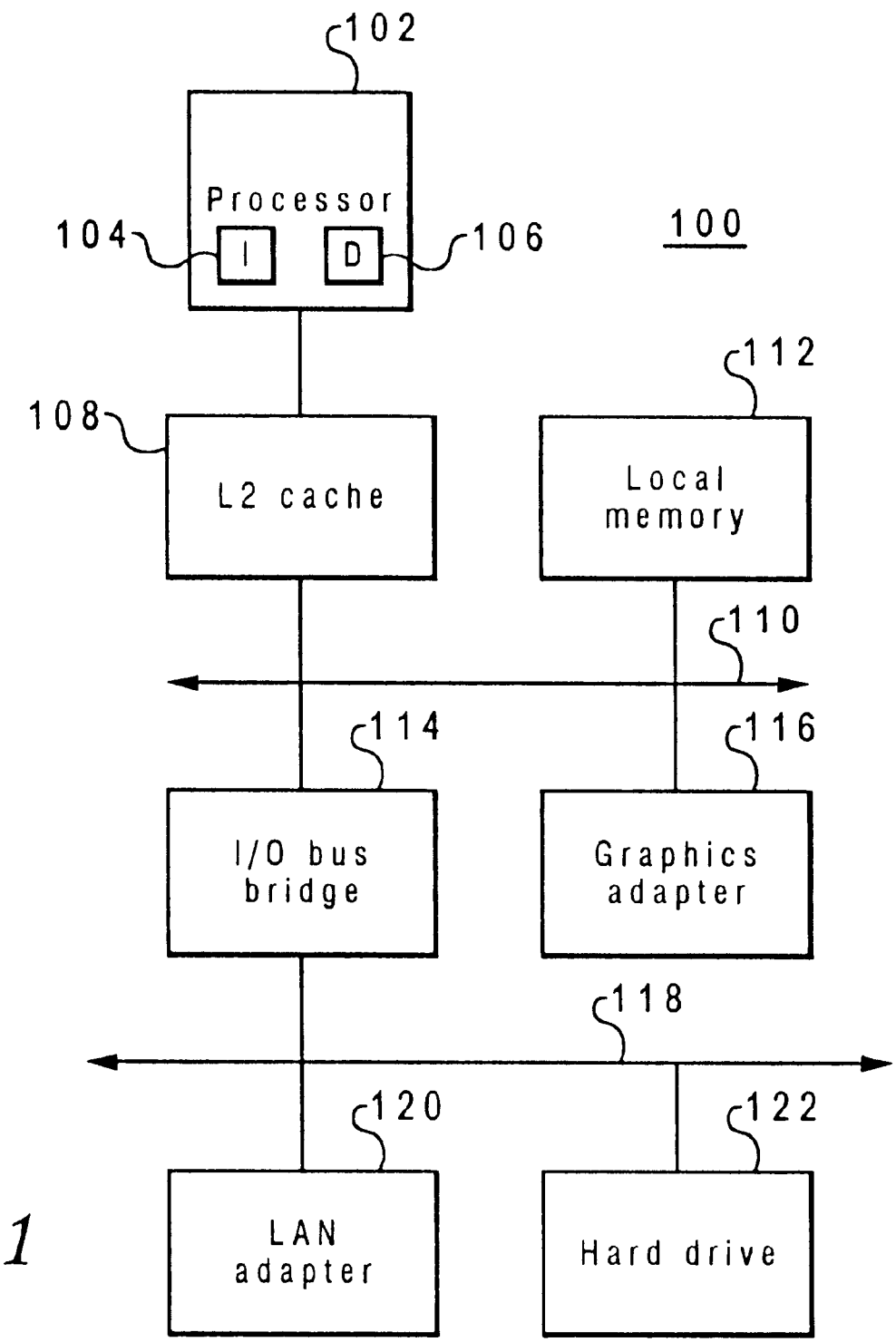
FIG. 1 depicts a data processing system implemented with a cache controller design in accordance with a preferred embodiment of the present invention.

With reference now to the figures, and in particular with reference to FIG. 1, a data processing system implemented with a cache controller design in accordance with a preferred embodiment of the present invention is depicted. Data processing system 100 may include only a single processor or may be a symmetric multiprocessor (SMP) system including a plurality of processors. A single processor system is shown in the example depicted. Processor 102 may be a superscalar reduced instruction set computing (RISC) processor including separate level one instruction and data caches 104 and 106 within the processor. A PowerPC™ processor may be utilized for processor 102.

Processor 102 is connected to a level two (L2) cache 108, which is a nonshared cache. A second processor (not shown) may be added to the system depicted, either with a separate L2 cache or sharing L2 cache 108 with processor 102. L2 cache 108 is connected to system bus 110 for data processing system 100. Local memory 112 is also connected to system bus 110, as is I/O bus bridge 114. Other devices, such as memory-mapped graphics adapter 116, may also be connected to system bus 110. I/O bus bridge 114 is connected to I/O bus 118, which may be connected to a variety of other devices such as local area network (LAN) adapter 120 and hard disk drive 122.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention. In particular, a data processing system need not be limited to a single processor as shown in the depicted example to benefit from the present invention. The present invention may be employed, for example, to improve the performance of a data processing system having two processors, each with a corresponding L2 cache.

Figure 2:
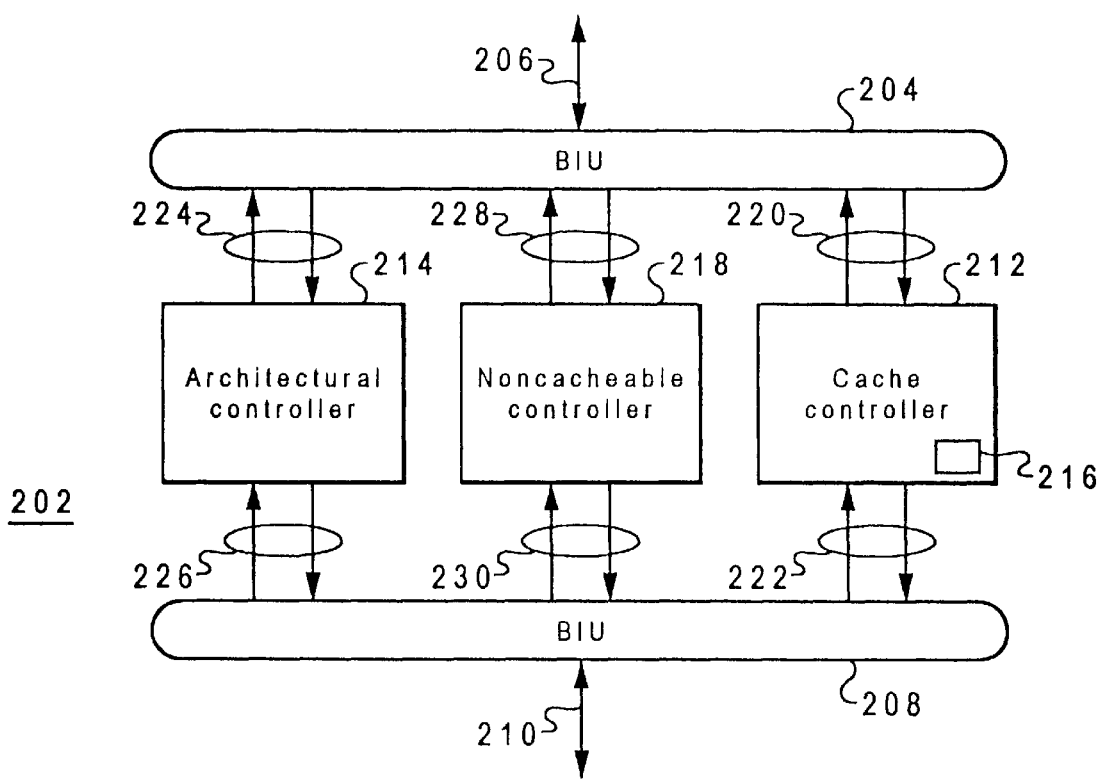
FIG. 2 is a block diagram of a cache controller design in accordance with a preferred embodiment of the present invention.

Referring to FIG. 2, a block diagram of a nonshared cache controller design in accordance with a preferred embodiment of the present invention is illustrated. Controller 202 is implemented within cache 108 depicted in FIG. 1. Controller 202 includes a bus interface unit (BIU) 204 connected to an upper bus 206 for a processor or a higher level cache, and a bus interface unit 208 to a lower bus 210, which may be a system bus or a bus to another cache. Upper bus 206 and lower bus 210 may differ; upper bus 206 may be, for example, a 60X bus, while lower bus 210 may be a different bus.

Cache and architectural specific functions within controller 202 are layered. Thus, controller 202 includes cache controller 212 and architectural controller 214. Operations are distinguished as "cache" or "architectural" operations. Only cache operations are handled by cache controller 212, and only cache controller 212 performs operations on cache 216. Architectural operations are handled by architectural controller 214 and are seen by cache controller 212 as system-side operations.

A third unit, noncacheable controller 218, is also contained within cache controller 202. Noncacheable controller 218 is actually a counterpart to cache controller 212 in that it also handles only cache operations. Whereas cache controller 212 handles cache operations directed at cache memory locations, noncacheable controller 218 handles cache operations directed at memory locations which do not map to cache 216. It is advantageous, for reasons known to those skilled in the art, to treat part of the system memory as noncacheable. Such memory may be utilized, for example, by memory mapped devices. While cache controller 212 operates on full cache blocks, noncacheable controller 218 operates on smaller memory segments, typically less than 8–16 bytes. Moreover, noncacheable controller 218 does not store data, while cache controller 212 retains copies of data handled within cache 216.

Cache operations are typically those operations which read or write values to memory locations, and therefore may change or retrieve the value of data in a memory location. Remaining operations are defined as architectural operations. Unlike cache operations, architectural operations generally do not change the value of data in a memory location. An architectural operation may move the data to a different location within the cache hierarchy, change the status of data in a particular memory location, or perform other such functions. However, architectural operations generally do not directly alter the value of data within a memory location.

Cache operations, supported by cache controller 212, comprise the largest majority of operations affecting the system cache. Within the complete set of operations supported by a given processor, cache operations may not derive from the portion of the instruction set which is most frequently executed and/or consume the largest majority of processor cycles. However, disregarding instructions directed to other functional units within the processor, such as the floating point, fixed point, or branch units, cache operations are, collectively, executed most often and utilize the largest measure of time.

The remaining operations affecting a system cache—those employed for cache management, operating system management, page management, and synchronization, etc.—are layered out and supported by architectural controller 214. Virtually all processor architectures support such operations, which are utilized in real time operation much less frequently than cache operations. Additionally, individual operations among the architectural operations are generally implemented, if at all, in substantially divergent manners for different processors of interest. Processor-side architectural operations pass through architectural controller 214 to system bus 210 and affects cache controller 212 as apparent system-side architectural operations.

Different designs may vary the set of operations supported by the cache controller and, by default, the remaining operations layered for support by the architectural controller. However, increasing the number of operations supported by the cache controller increases the complexity of logic required. Additionally, if instructions selected for support by the cache controller are not supported by all processors of interest, the cache controller design loses its direct transferability to new controller designs.

While certain operations pass down only one path within controller 202—that is, through architectural controller 214 or cache controller 212—other operations are split and pass down both paths. Cache controller 212 employs a pass-through design, in which operations initiated at interface 220 generate a response at interface 222 while operations initiated at interface 222 produce a responsive action at interface 220.

Because cache and architectural operations are layered within controller 202, bus transactions and protocols may also be layered. That is, generic interfaces may be defined for cache controller 212, architectural controller 214, and noncacheable controller 218. Thus, interfaces 220–230 comprise generic protocol interfaces to bus interface units 204 and 208 which are, to the extent possible, not architecturally specific. This decouples the design for cache controller 212 from the specific protocols of bus 206 and bus 210, allowing the design for cache controller 212 to be reused. Bus interface units 204 and 208 are responsible for managing transactions and protocols to bus 206 and system bus 210, translating the specific bus transactions into the protocol for generic interfaces 220–230. By employing generic interfaces for interfaces 220–230, the designs for controllers 212, 214, and 218 are isolated from specific bus architectures and may be readily duplicated.

In contrast to traditional cache controllers, cache controller 212 may thus be implemented in a manner independent of the two buses 206 and 210, responding only to cache operations. Although such cache operations are initiated by transactions on either bus 206 or bus 210, only certain bus transactions will prompt a response within cache controller 212. In a preferred embodiment, cache controller 212 only responds to instruction fetch operations (IFETCH), LOAD operations, and WRITE operations on bus 206, and to READ operations, WRITE operations, and traditional SNOOPS on bus 210. This results in substantially simplified design requirements for cache controller 212. This is accomplished by avoiding the usual practice of overlaying the highly irregular (semantically and temporally) architectural operations and cache operations. The burden of responding to the architectural operations is removed from the design of cache controller 212 and placed in architectural controller 214.

The cache operations handled by cache controller 212 are supported by every commercial processor of interest in substantially the same form. Only minor differences in specific implementation, from which cache controller 212 in the present invention is decoupled by generic interfaces 220 and 222, distinguish comparable instructions for different processors of interest.

By layering selected cache and architectural functions, and implementing generic interfaces to bus interface units 204 and 208, a large portion of the overall design of controller 202 may be directly transferred to new implementations. The cache controller logic may be reused without modification for cache operations. New sleeves of logic for the bus interface units may be easily implemented for handling new bus protocols and converting the generic protocol interfaces 220–230 of cache, architectural, and noncacheable controllers 212, 214, and 218 to interfaces for bus 206 and bus 210. The most significant effort for implementing a design supporting a different processor is required by the architectural controller. Individual design of the logic supporting the architectural operations is required in any case since processor architectures vary dramatically. Overall, however, a significant savings in design effort for different processors may be achieved since only the semantics of operations handled by architectural controller 214 will change.

By layering cache and architectural functions, limiting cache controller 212 to responding to a few fundamental operations, the cache controller logic is greatly streamlined and simplified. In addition, the architectural controller logic is also simplified since, by separating the two classes of operations, issues of interrelationships between operations in different classes are eliminated. The cache and architectural controllers may be designed as individual units.

Bus interface unit 204 splits complex operations initiated by a local processor (not shown). Referring again to the PowerPC™ architecture as an example.

Complex operations typically have information overlaid on basic operations, such as a READ or WRITE operation. For example, the PowerPC™ architecture supports a number of variations of the WRITE with kill operation, including: WRITE with kill due to cast out, WRITE with kill due to block clean, and WRITE with kill due to block invalidate. Each variation described has information overlaid on the basic WRITE operations. The first variation described, WRITE with kill due to cast out, simply requires that the cache block be written to the present cache level. Write with kill due to block clean requires that the block be written to each hierarchy level from the present cache level to system memory. The last variation described, WRITE with kill due to block invalidate, requires that the block be written to system memory and that the block be invalidated in every cache hierarchy level. Thus, the complex WRITE with kill operation includes distinct elements of information overlaid on the basic WRITE operation.

Generally, the information overlaid on a basic operation to form a complex operation is architectural in nature. Stated differently, complex operations are generally architectural variants of basic operations. The architectural aspect of a complex operations may therefore generally be split from the nonarchitectural portion. The architectural portion may then be passed to architectural controller 214, while the nonarchitectural portion is passed to cache controller 212. Because architectural controller 214 handles the architectural portion of a complex operation and is layered from cache controller 212, the logic in cache controller 212 is unaware of any distinction between basic operations initiated as such and basic operations generated by splitting a complex operation.

The basic and architectural portions of complex operations are thus handled separately, although in a coordinated manner. The architectural portion of a complex operation does not necessarily propagate through architecture controller 214, but may simply change the state of engines within architectural controller 214 to maintain the semantics of the operation. The READ atomic operation is one such operation.

Complex operations must be split on an individual basis by ascertaining the basic operation within the complex operation. For example, the WRITE with kill due to block invalidate operation devolved into a WRITE operation handled by cache controller 212 and a FLUSH operation handled by architectural controller 214. This pair of operations achieves the same result as a WRITE with kill due to block invalidate: the block is written to the present cache level, then written all the way down to the system memory, invalidating the block in all higher hierarchy levels.

Complex operations initiated by a local processor are devolved into simpler operations by bus interface unit 204, with the simpler operations dispatched separately to architectural controller 214 and cache controller 212. Operations snooped on system bus 210 have generally already been devolved into simple operations (READs and WRITES) and therefore do not require splitting.

The relationship between splitting complex operations and layering cache and architectural specific functions is somewhat circular. Absent layering of cache and architectural specific functions within the device performing the operation, complex operations could not be split. In fact, no logical need would exist for splitting the operations. On the other hand, complex operations must be devolved into basic and architectural portions in order to successfully layer cache and architectural specific functions.

Although the exemplary embodiment of the present invention described above utilized the PowerPC™ architecture, the selection of this architecture is not intended to imply any limitations to the present invention. Complex operations will vary from architecture to architecture. However, complex operations supported by most architectures should be capable of being split if cache and architectural specific functions for that architecture are layered within the device performing the operations.

Figure 3:
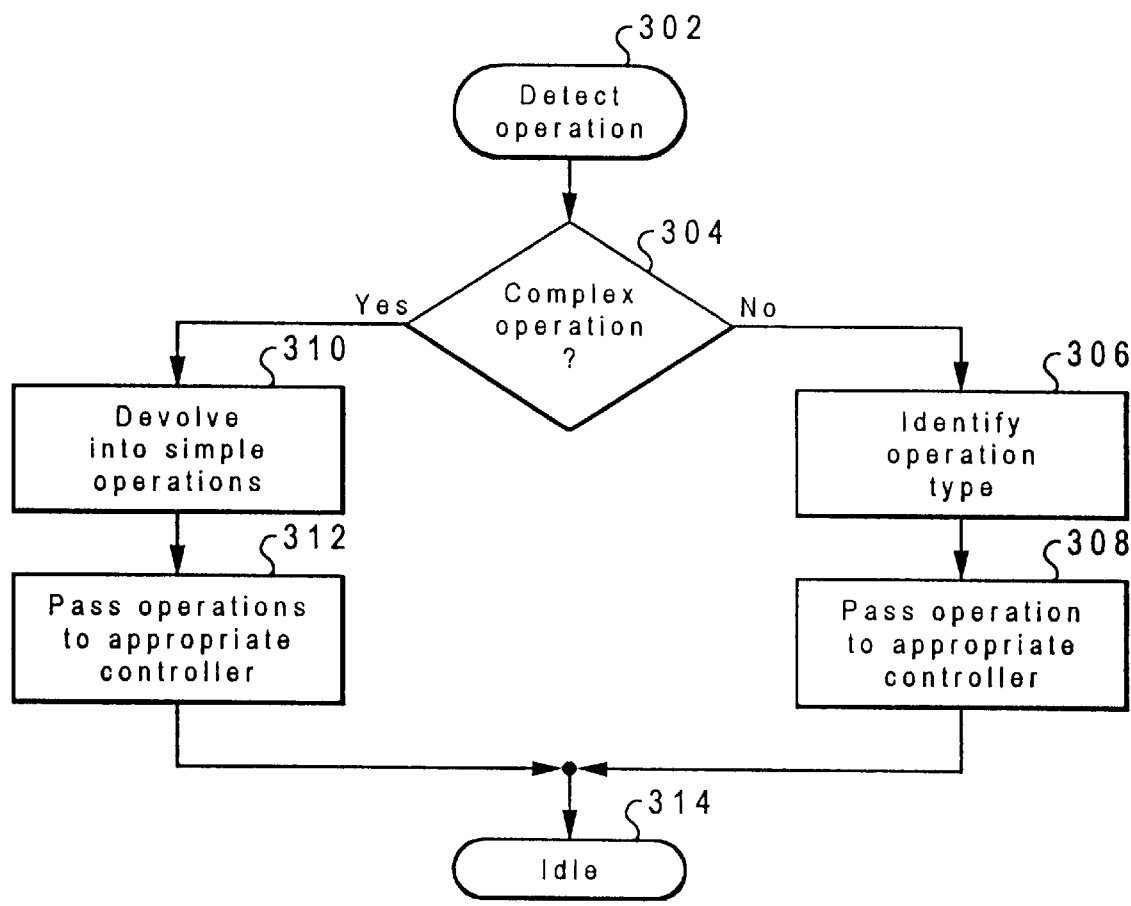
FIG. 3 depicts a high level flowchart for a process of splitting operations in accordance with a preferred embodiment of the present invention.
Figure 4:
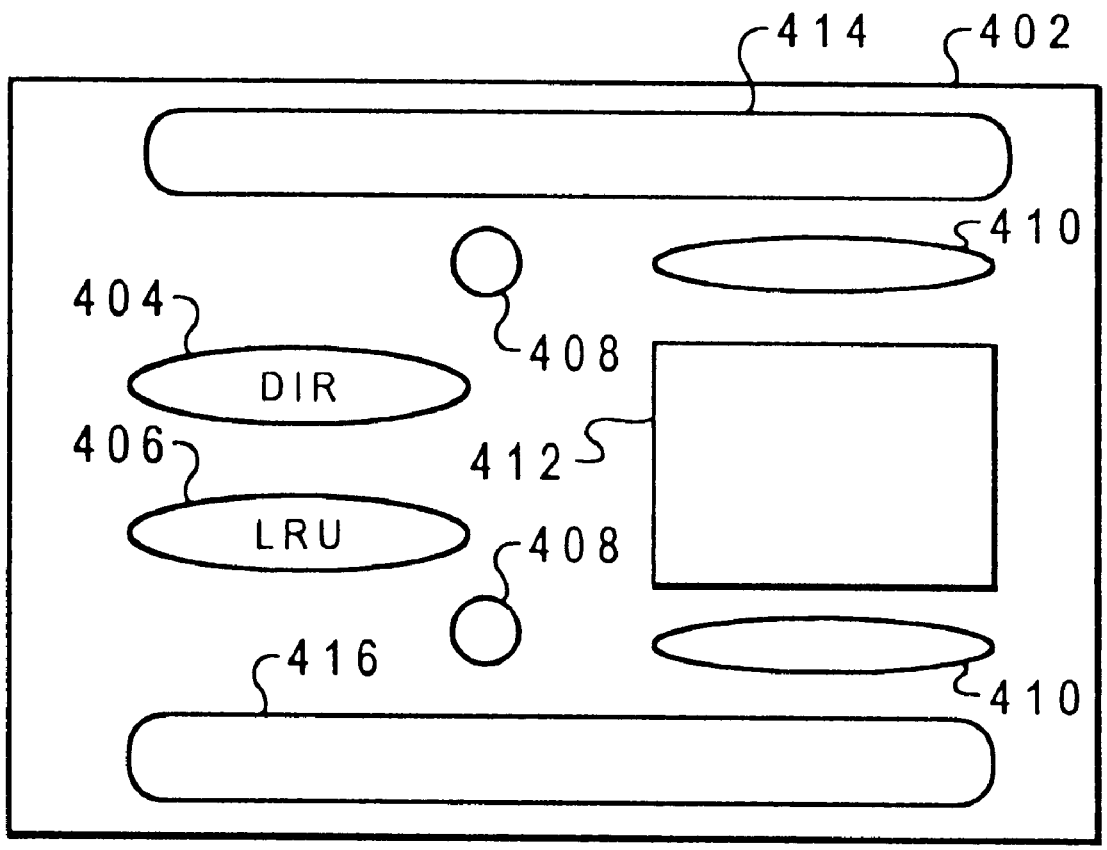
FIG. 4 is a prior art cache controller design.

With reference now to FIG. 3, a high level flowchart for a process of splitting operations in accordance with a preferred embodiment of the present invention is depicted. The process begins at step 302, which illustrates detection of an operation on the processor bus. The process then passes to step 304, which illustrate a determination of whether the operation is a complex operation. If not, the process proceeds to step 306, which depicts identification of the type of the operation (cache or architectural), and then passes to step 308, which illustrates passing the operation to the appropriate controller (cache, noncacheable, or architectural). The process then passes to step 314, which depicts the process becoming idle until another operation is detected.

Referring again to step 304, if the operation is determined to be complex, the process proceeds instead to step 310, which illustrates devolving the operation into equivalent simple operations. The process then passes to step 312, which depicts passing the simple operations to corresponding cache or architectural controllers, and then to step 314, which illustrates the process becoming idle as described above.

The present invention allows complex operations to be split into equivalent simple operations within a controller layering cache and architectural specific functions. This permits logic supporting the operation to be simplified and run faster.

While the invention has been particularly shown and described with reference to a preferred embodiment, it will be understood by those skilled in the art that various changes in form and detail may be made therein without departing from the spirit and scope of the invention.

What is claimed is:

1. A method of handling operations in a data processing system, comprising:

detecting a complex operation on a bus targeting a storage location within a storage device;

performing at least one simple operation corresponding to a portion of the complex operation in a first controller unit for the storage device; and performing a second portion of the complex operation in a second controller unit for the storage device.

2. The method of claim 1, wherein the step of detecting a complex operation on a bus targeting a storage location within a storage device further comprises:

detecting an architectural operation on the bus.

3. The method of claim 2, wherein the step of performing at least one simple operation corresponding to a portion of the complex operation in a first controller unit for the storage device further comprises:

performing a cache operation corresponding to a portion of the architectural operation.

4. The method of claim 1, wherein the step of performing at least one simple operation corresponding to a portion of the complex operation in a first controller unit for the storage device further comprises:

performing the at least one simple operation within a cache controller unit for the storage device.

5. The method of claim 1, wherein the step of performing at least one simple operation corresponding to a portion of the complex operation in a first controller unit for the storage device further comprises:

performing the at least one simple operation within a noncacheable controller unit for the storage device.

6. The method of claim 1, wherein the step of performing a second portion of the complex operation in a second controller unit for the storage device further comprises:

performing the second portion of the complex operation within an architectural controller unit for the storage device.

7. The method of claim 1, further comprising:

coordinating performance of the simple operation and the second portion of the complex operation within controller units for the storage device to maintain semantics of the complex operation.

8. A controller, comprising:

a plurality of controller units for a storage device, each controller unit performing operation portions of a different type, the plurality of controller units including:
    a cache controller unit performing cache operations for storage locations within the storage device; and
    an architectural controller unit performing architectural operations for storage locations within the storage devices; and a bus interface unit receiving operations from a bus and, responsive to receiving a complex operation, initiating at least a portion of the complex operation within each of the plurality of controller units, wherein a different portion of the complex operation is performed within each of the controller units.

9. The controller of claim 8, wherein the plurality of controller units further comprise:

a noncacheable controller unit performing cache operations for noncacheable storage locations within the storage device.

10. The controller of claim 8, wherein the bus interface unit initiates a cache operation corresponding to a portion of the complex operation in the cache controller unit.

11. The controller of claim 8, wherein the bus interface unit initiates a portion of the operation corresponding information overlaid on a cache operation in the architectural controller unit.

12. The controller of claim 8, wherein the bus interface unit initiates a cache operation corresponding to a portion of the complex operation in the cache controller unit and initiates a portion of the operation corresponding information overlaid on the cache operation in the architectural controller unit.

13. A storage system, comprising:

a data storage device;

a cache controller performing each cache operation for data storage within the data storage device;

an architectural controller performing portions of each architectural operation corresponding to information overlaid on a component cache operation for data storage within the data storage device; and a bus interface unit which, in response to receiving an architectural operation:
    initiates a component cache operation of the architectural operation within the cache controller; and
    initiates a portion of the architectural operation corresponding to information overlaid on the component cache operation within the architectural controller.

14. The storage system of claim 13, wherein the data storage device is a cache.

15. The storage system of claim 13, further comprising:

a noncacheable controller performing each cache operation for noncacheable data storage within the data storage device.

16. The storage system of claim 13, wherein the bus interface unit, in response to receiving the architectural operation, splits the architectural operation into the component cache operation and the portion of the architectural operation corresponding to information overlaid on the component cache operation.

17. The storage system of claim 13, wherein the bus interface unit receives operations from a processor bus.

18. The storage system of claim 13, wherein the bus interface unit receives operations from a higher level data storage device above the data storage device within a storage hierarchy.

19. The storage system of claim 13, wherein the portion of the architectural operation corresponding to information overlaid on the component cache operation changes the state of engines within the architectural controller to maintain semantics of the architectural operation.

* * * * *